US009992227B2

(12) United States Patent
Thomas et al.

(10) Patent No.: US 9,992,227 B2
(45) Date of Patent: Jun. 5, 2018

(54) SECURE REMOTE MAINTENANCE AND SUPPORT SYSTEM, METHOD, NETWORK ENTITY AND COMPUTER PROGRAM PRODUCT

(75) Inventors: Erika Thomas, Little Elm, TX (US); Jeff Hughes, Irving, TX (US); David Turner, Keller, TX (US); Jason Henriksen, Hurst, TX (US); Donald Davidson, Keller, TX (US); Benjamin Alderson, Fort Worth, TX (US); James Fortuna, Dallas, TX (US)

(73) Assignee: NCR Corporation, Atlanta, GA (US)

( * ) Notice: Subject to any disclaimer, the term of this patent is extended or adjusted under 35 U.S.C. 154(b) by 763 days.

(21) Appl. No.: 12/349,945

(22) Filed: Jan. 7, 2009

(65) Prior Publication Data
US 2010/0174812 A1    Jul. 8, 2010

(51) Int. Cl.
*G06F 15/173* (2006.01)
*H04L 29/06* (2006.01)
*G06F 21/30* (2013.01)

(52) U.S. Cl.
CPC ............ *H04L 63/20* (2013.01); *G06F 21/305* (2013.01); *H04L 63/0272* (2013.01); *G06F 2221/2115* (2013.01)

(58) Field of Classification Search
CPC . G06F 21/305; H04L 43/0876; H04L 61/1511
USPC ........................................................ 709/223
See application file for complete search history.

(56) References Cited

U.S. PATENT DOCUMENTS

| 4,667,087 | A | * | 5/1987 | Quintana .............. G07F 7/1008 235/379 |
|---|---|---|---|---|
| 6,529,620 | B2 | | 3/2003 | Thompson .................... 382/141 |
| 7,068,301 | B2 | | 6/2006 | Thompson .................... 348/141 |
| 7,152,002 | B2 | | 12/2006 | Lingren et al. ................. 702/23 |
| 7,152,035 | B1 | | 12/2006 | Suhy, Jr. .......................... 705/1 |
| 7,430,759 | B2 | | 9/2008 | Piepiorra et al. .............. 726/11 |
| 2002/0019948 | A1 | | 2/2002 | Katou et al. .................. 713/202 |
| 2002/0120582 | A1 | * | 8/2002 | Elston et al. ................... 705/64 |

(Continued)

OTHER PUBLICATIONS

Security Park.net, "Secure Remote Maintenance of Production Equipment," 4 pages, Jul. 6, 2007.

(Continued)

*Primary Examiner* — Anthony Mejia
*Assistant Examiner* — Marie Georges Henry
(74) *Attorney, Agent, or Firm* — Schwegman, Lundberg & Woessner (57) ABSTRACT

A remote, secure maintenance and support system, method, network entity and computer program product are provided. The system can include site terminal(s) and/or a site server (collectively "site device(s)"), a data center in communication with the site device(s) over a first secure tunnel, and at least one client terminal in communication with the data center over a second secure tunnel. The site device(s) can be configured to periodically transmit to the data center one or more error messages over the first secure tunnel. The data center can, in turn, be configured to make the error messages accessible to at least one authorized technician operating one of the client terminals. The client terminal can be configured to retrieve at least one of the error messages over the second secure tunnel and to take an action associated with resolving the error message.

10 Claims, 6 Drawing Sheets

(56) References Cited

U.S. PATENT DOCUMENTS

| | | | | |
|---|---|---|---|---|
| 2002/0181405 | A1 | 12/2002 | Ying | 370/245 |
| 2002/0188706 | A1 | 12/2002 | Richards et al. | 709/223 |
| 2004/0148288 | A1 | 7/2004 | Haeberle et al. | 707/10 |
| 2004/0153560 | A1* | 8/2004 | Masuhiro et al. | 709/229 |
| 2004/0255004 | A1* | 12/2004 | Weseloh | 709/217 |
| 2005/0065842 | A1 | 3/2005 | Summers | 705/11 |
| 2005/0085964 | A1 | 4/2005 | Knapp et al. | 701/33 |
| 2005/0203755 | A1 | 9/2005 | Krishnamoorthy | 705/1 |
| 2006/0031476 | A1* | 2/2006 | Mathes et al. | 709/224 |
| 2006/0136774 | A1* | 6/2006 | Nagafuchi | G06Q 10/06 714/4.4 |
| 2006/0173591 | A1* | 8/2006 | Knapp et al. | 701/33 |
| 2006/0195550 | A1 | 8/2006 | Craik | 709/217 |
| 2007/0022051 | A1* | 1/2007 | Regan et al. | 705/40 |
| 2007/0083449 | A1* | 4/2007 | Roberts | 705/35 |
| 2007/0130457 | A1 | 6/2007 | Kamat et al. | 713/151 |
| 2007/0250411 | A1 | 10/2007 | Williams | 705/28 |
| 2008/0086284 | A1* | 4/2008 | Nagafuchi et al. | 702/184 |
| 2008/0199052 | A1* | 8/2008 | Okamoto | H04N 1/00843 382/115 |
| 2009/0150977 | A1* | 6/2009 | Carley | 726/3 |
| 2009/0313631 | A1* | 12/2009 | De Marzo | G06F 9/5038 718/103 |

OTHER PUBLICATIONS

Press Release, "Innominate presents the mGuard Tele Service—secure remote maintenance via Internet," 3 pages, Apr. 24, 2006.

"Web Module enables remote system management/maintenance. (New IDEC Web Server Module Provides All the Features You Want in One Unit)," Product News Network, 2 pages, Apr. 25, 2006.

Passadore et al., "A Multi-Agent Platform Supporting Maintenance Companies on the Field," Via San Nazaro 19, 16145 Genova, Italy, 9 pages, Sep. 2007.

"Fix presses faster with remote service," American Printer, 3 pages, Jul. 1, 2005.

"Security and Privacy Requirements for Remote Servicing," The Security and Privacy Committee Medical Imaging Informatics Section, NEMA, 4 pages, Apr. 26, 2001.

Avaya, Inc., Validating Service Technicians from VeriSign, Inc., 5 pages, retrieved Apr. 28, 2008.

ION Networks, ION Prisms & SA5600 Series Product Description, available at http://www.ionnetworks.com/products.html, retrieved Apr. 27, 2008.

"All Covered Secure Remote Access—With our secure remote access tool, technicians can troubleshoot and complete maintenance tasks faster,"Information Technology Services for Small Business, 2 pages, retrieved Apr. 28, 2008.

Press Release—"Uplogix Enhances Secure Remote Management Appliance for Managing Distributed Networks," Uplogix, Inc., 3 pages, Mar. 31, 2008.

"Network Appliance provides secure remote maintenance. (First Future-Proof Industrial Remote Service Device Launched)," Product News Network, 2 pages, Jun. 26, 2007.

"Remote Services Security/Remote Maintenance," Innominate, 2 pages, available at http://www.innominate.com/content/view/243/220/lang,en/, retrieved Apr. 27, 2008.

Osório et al., "Reliable and secure communications infrastructure for virtual enterprises," Journal of Intelligent Manufacturing, pp. 171-183, Dec. 1999.

Aviation Maintenance, "Software—Digital Signature Technology Available," 2 pages, Mar. 1, 2005.

Avaya, Inc. "Avaya Global Services, Secure Access and Control," Product Brief, 2 pages, 2005.

Radiant Systems, "Command Center v2.0 Technical Overview—Quick Reference Guide," 2 pages, Mar. 25, 2008.

Radiant Systems, "Command Center v2.0 Quick Reference Guide—Command Center Screen Overview," 4 pages, Mar. 25, 2008.

Radiant Systems, "Product Training Guide—Command Center," 15 pages, May 16, 2008.

Radiant Systems, "Command Center," Product Overview, 2 pages, Jul. 7, 2008.

Radiant Systems, "Radiant Innovations—Command Center—Site monitoring, reporting and powerful, consistent support," 10 pages, Mar. 2008.

Radiant Systems, "Command Center," 30 pages, Mar. 2008.

* cited by examiner

SECURE REMOTE MAINTENANCE AND SUPPORT SYSTEM, METHOD, NETWORK ENTITY AND COMPUTER PROGRAM PRODUCT

FIELD

Embodiments of the invention relate, generally, to the provisioning of secure, remote maintenance and support for information technology systems.

BACKGROUND

Information technology systems utilized in retail, entertainment and restaurant operations continue to grow in scope and complexity while under continuous pressure to reduce costs related to acquisition, support and maintenance. Suppliers of all types of system components are therefore incorporating capabilities that more easily allow for low cost maintenance, diagnosis and troubleshooting of remote installations. Of particular value are enhancements that allow faster, simpler and more powerful access to remote systems by support and maintenance technicians.

As these pressures come to bear, however, new and unprecedented requirements related to ensuring the security of consumer and business information handled and stored by systems are being placed on suppliers and operators. An example of these requirements are those imposed by PCI DSS (Payment Card Industry Data Security Standard), a multifaceted security standard which was developed by the major credit card companies and is aimed at preventing credit card fraud, hacking and various other security vulnerabilities and threats. Under particularly close scrutiny are any system implementations or business processes which might allow unauthorized access to remote installations, thereby creating the risk of security breaches and theft of sensitive data.

These trends and their related pressures are in clear conflict. On one hand, what serves to make systems more easily accessed with a high level of privilege on the part of a remote technician can also make those same systems far more vulnerable to breaches and theft. On the other hand, what serves to make systems more centrally and rigidly controlled from the standpoint of remote access and privilege also serves to drive up capital costs and operating costs related to network infrastructure, maintenance and support.

A need, therefore exists, for a more secure support and maintenance system which enables powerful capabilities at lower operating costs while using existing infrastructure.

BRIEF SUMMARY

In general, embodiments described herein provide, among other things, a remote, secure maintenance and support system, method, network entity and computer program product. The system of embodiments described herein can provide an enterprise-level dashboard view of servers, point-of-sale terminals, and other specialized devices operating at various sites (e.g., restaurants, hotels, movie theaters, gas stations, arena stadiums, etc.). The system can be used to monitor the health of these site devices, perform queries, transfer files, receive alerts, and much more, all via a secure remote connection that does not require assuming control of those devices and will result in little, if any, intrusion or obstruction of the operations of those devices.

In accordance with one aspect, a maintenance and support system is provided. In one embodiment, the system can include a computing device, a network entity in communication with the computing device over a first secure tunnel, and at least one client terminal in communication with the network entity over a second secure tunnel, wherein the client terminal is not in direct communication with the computing device. The computing device can be configured to periodically transmit, and the network entity configured to receive, one or more error messages over the first secure tunnel. The network entity can, in turn, be configured to make the one or more error messages accessible to at least one authorized technician. According to one embodiment, the at least one client terminal, which is associated with the at least one authorized technician, can be configured to retrieve at least one of the one or more error messages over the second secure tunnel and to take an action associated with resolving the error message.

In one embodiment, the system can further include one or more site terminals in communication with the computing device. These site terminals can be configured to periodically, and automatically, monitor for one or more error conditions associated with the site terminal. The site terminals can be further configured to generate one or more error messages based at least in part on the monitored error conditions, and to transmit the one or more error messages to the computing device. In one embodiment, the one or more error messages transmitted by the computing device to the network entity over the first secure tunnel can include the one or more error messages generated and transmitted by respective site terminals.

In accordance with another aspect, a method is provided for providing maintenance and support. In one embodiment, the method can include: (1) receiving, from a computing device over a first secure tunnel, one or more error messages; (2) receiving, from a client terminal over a second secure tunnel, an authentication request associated with a technician; (3) authenticating the technician; (4) determining whether the technician has permission to access at least one of the one or more error messages received; and (5) providing the client terminal with access to the at least one of the one or more error messages over the second secure tunnel, if is determined that the technician has permission.

According to yet another aspect, a network entity is provided for providing maintenance and support. In one embodiment, the network entity can include a processor configured to: (1) receive, from a computing device over a first secure tunnel, one or more error messages; (2) receive, from a client terminal over a second secure tunnel, an authentication request associated with a technician; (3) authenticate the technician; (4) determine whether the technician has permission to access at least one of the one or more error messages received; and (5) provide the client terminal with access to the at least one of the one or more error messages over the second secure tunnel, if is determined that the technician has permission.

In accordance with yet another aspect, a computer program product is provided for providing maintenance and support. The computer program product can contain at least one computer-readable storage medium having computer-readable program code portions stored therein. The computer-readable program code portions of one embodiment can include: (1) a first executable portion for periodically, and automatically, monitoring for one or more error conditions; (2) a second executable portion for generating one or more error messages based at least in part on the monitored error conditions; and (3) a third executable portion for transmitting the one or more error messages to a network entity over a secure tunnel.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the maintenance and support system, method, network entity and computer program product now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Figure 1:
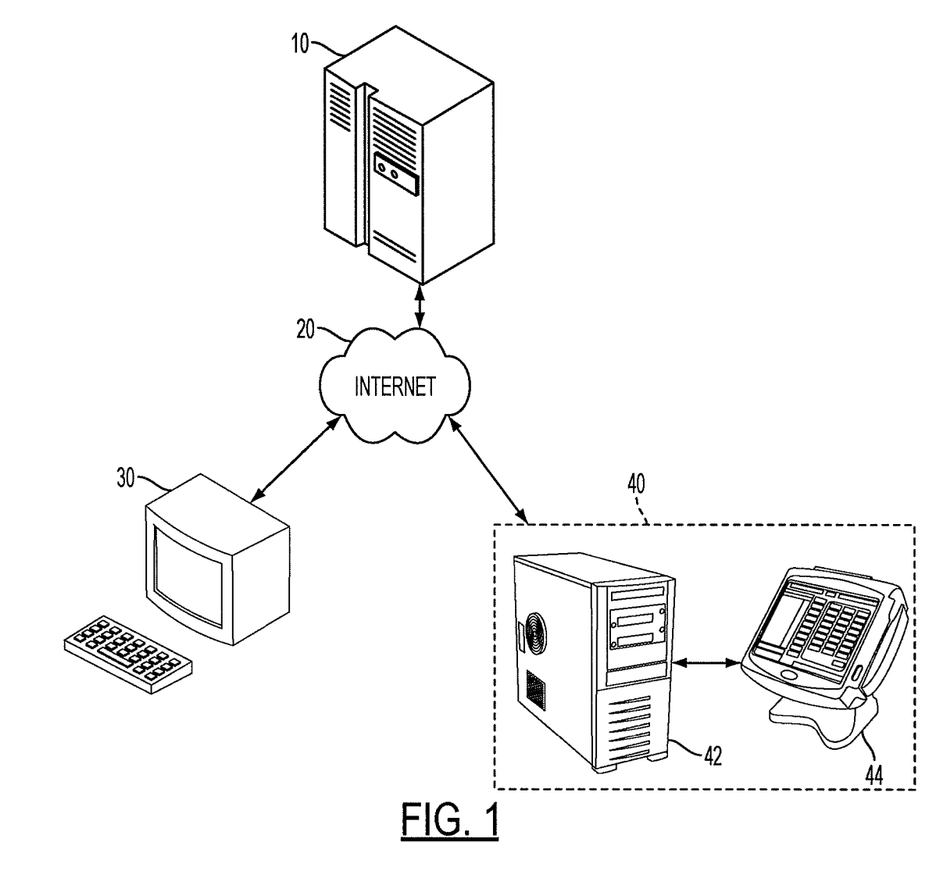
FIG. 1 is a block diagram of one type of system that would benefit from embodiments described herein.

Overall System:

Referring to FIG. 1, an illustration of one type of maintenance and support system that would benefit from embodiments described herein is provided. As shown in FIG. 1, the system can include a data center 10 configured to act as a proxy between one or more client terminals 30 and one or more devices 42, 44, located at a particular site 40 (e.g., a restaurant, hotel, movie theater, gas station, etc.) for the purpose of enabling a technician operating a client terminal 30 to monitor and take action to resolve any error conditions that may occur in association with one of the site devices 42, 44 without the technician assuming control of the site device 42, 44 or being required to have specific knowledge of any identifying criteria associated with the site device 42, 44. The data center 10 can further be used to gather information associated with the various site devices 42, 44, such that different audit reports, and the like, can be generated.

According to one embodiment, the data center 10 can include one or more servers, or similar network entities configured to receive, store and make accessible to one or more authorized technicians information associated with the various site devices 42, 44, as well as facilitate communications between an authorized technician, operating a client terminal 30, and the site devices 42, 44 (discussed in more detail below). The data center 10 may further comprise one or more databases, either incorporated within or electrically or optically coupled to the one or more servers. As discussed in more detail below, these databases may store information, such as authentication and permission information associated with various authorized technicians, as well as identifying criteria associated with various site devices 42, 44 (e.g., IP address, domain name, network address, username, password, etc.). This information can be used by the data center 10 to authenticate technicians, determine which actions the technician can take with respect to which site devices 42, 44, as well as enable an authorized technician to monitor and take action with respect to a site device 42, 44 without either (i.e., neither the technician nor the site device accessed) having specific knowledge of the other. In particular, according to one embodiment, the technician need not have specific knowledge of the accessed site device's identifying criteria.

According to one embodiment, the client terminal 30 can include any computing device including, for example, a personal computer (PC), laptop, personal digital assistant (PDA), or the like. As discussed in more detail below, the client terminal 30 may be operated by an authorized technician to monitor and address (via the data center 10) error conditions that may occur on a site device 42, 44 to which the technician has permission to access.

In one embodiment, a "site" 40 may refer to a physical location, such as a restaurant, hotel, movie theater, gas station, and/or the like, having one or more site terminals 44 that can be used to complete various transactions or perform various functions associated with that site 40. According to one embodiment, these site terminals 44 may include point-of-sale terminals, kitchen controllers, fuel controllers, electronic payment controllers and/or other electronic devices or peripherals, such as PCs, laptops, PDAs, or the like. In one embodiment, these site terminals 44 may each communicate with a site server 42 over a wired or wireless local area network (LAN), personal area network (PAN), or the like. In particular, as discussed in more detail below, the site terminals 44 can be configured to periodically, and automatically, monitor certain error conditions and gather data associated with the site terminals 44. The site terminals 44 can be further configured to transmit this information (e.g., error messages associated with the error conditions and the retrieved data) to the site server 42 (e.g., via a wired or wireless LAN, PAN, or the like). In turn, the site server 42 may be configured compile the information received from one or more site terminals 44 operating at the site 40 and communicate that information to the data center 10. Alternatively, according to another embodiment, the site terminals 44 may communicate directly with the data center 10.

In addition, according to one embodiment, the site server 42 may, itself, act as a site terminal. In this embodiment, the site server 42 may further gather similar information (e.g., error messages and data) associated with itself, and include this information in that sent to the data center 10. According to one embodiment, the site server 42 can be configured to use standard ports for establishing a connection to the data center 10. The use of standard ports may eliminate the need to specifically configure the site server 42 to communicate with the data center 10. While referred to as a "server," as one of ordinary skill in the art will recognize in light of this disclosure, the site server 44 may comprise any computing device or network entity configured to perform the functionality described herein, and is not limited to the client-server architecture.

According to one embodiment, the data center 10 can be in communication with the client terminal 30 and the site server 42 (and, in one embodiment, the site terminals 44) via the same or different network 20 (e.g., wired or wireless wide area network (WAN), LAN, PAN, etc.). However, according to one embodiment, the client terminal 30 and site server 42 access the data center 10 over separate and distinct secure tunnels. For example, in order to create the secure tunnels, communications to and from the data center 10 may be encrypted using Secure Sockets Layer (SSL), Secure Shell (SSH), or other secure communications techniques. Use of a secure tunnel, rather than a virtual private network (VPN), may reduce the amount of overhead associated with the communication. According to this embodiment, the client terminal 30 and the site devices 42, 44 are not in direct communication. In other words, all communication between the client terminal 30 and the site devices 42, 44 is via the data center 10.

Figure 2:
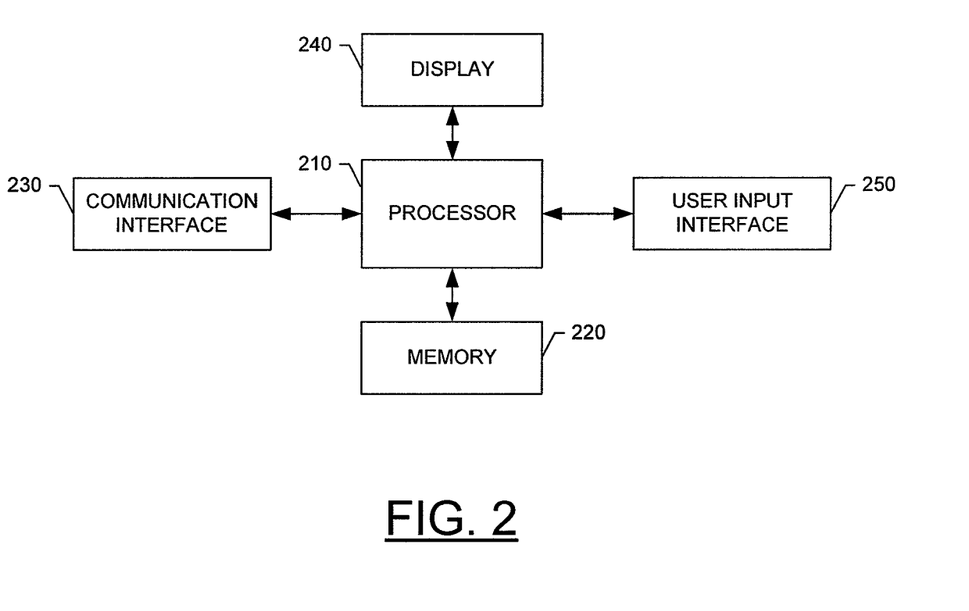
FIG. 2 is a schematic block diagram of an entity capable of operating as a data center, client terminal, site terminal or site server in accordance with embodiments described herein.

Data Center, Client Terminal & Site Devices:

Referring now to FIG. 2, a block diagram of an entity capable of operating as a data center 10, client terminal 30, site terminal 44 and/or site server 42 is shown in accordance with one embodiment. The entity capable of operating as a data center 10, client terminal 30, site terminal 44 and/or site server 42 can include various means for performing one or more functions in accordance with embodiments of the present invention, including those more particularly shown and described herein. It should be understood, however, that one or more of the entities may include alternative means for performing one or more like functions, without departing from the spirit and scope of embodiments described herein. As shown, the entity capable of operating as a data center 10, client terminal 30, site terminal 44 and/or site server 42 can generally include means, such as a processor 210 for performing or controlling the various functions of the entity.

In particular, the processor 210 may be configured to perform one or more of the processes discussed in more detail below with regard to FIGS. 3A-3C. For example, according to one embodiment wherein the entity represents the data center 10, the processor 210 may be configured to receive, from a site server 42 (or in one embodiment a site terminal 44) over a first secure tunnel one or more error messages. In addition, the processor 210 may be configured to receive, from a client terminal 30 over a second secure tunnel, an authentication request associated with a technician, to authenticate the technician, and to determine whether the technician has permission to access at least one of the one or more error messages received. If it is determined that the technician has permission, the processor 210 may be further configured to provide the client terminal 30 with access to the at least one of the one or more error messages over the second secure tunnel.

According to another embodiment wherein the entity represents the client terminal 30, the processor 210 may be configured to retrieve, from the data center 10 over a secure tunnel, one or more error messages associated with a site terminal 44 to which the client terminal (and, in particular, a technician operating the client terminal) has access. The processor 210 may thereafter be configured to generate an action request requesting that an action be taken by the corresponding site terminal 44 in order to begin resolving at least one of the error messages, and to transmit the action request to the data center 10.

According to yet another embodiment wherein the entity represents the site terminal 44, the processor 210 may be configured to periodically, and automatically, monitor for one or more error conditions, generate one or more error messages based at least in part on the monitored error conditions, and transmit the one or more error messages either directly to the data center 10, or to the data center 10 via the site server 42. In addition, the processor 210 may be further configured to retrieve an action request generated by a client terminal 30 either directly from the data center 10 or from the data center 10 via the site server 42, and to take the action specified in the action request.

Finally, according to another embodiment wherein the entity represents the site server 42, the processor 210 may be configured to receive one or more error messages from each of one or more site terminals 44 associated with the site server 42, compile the error messages and transmit the error messages to the data center 10 over a secure tunnel. The processor 210 may further be configured to generate and transmit to the data center 10 a message request requesting any messages (e.g., action requests) intended for one of the site terminals 44. In response to receiving the messages, the processor 210 may further be configured to route the messages to the appropriate site terminal 44.

In one embodiment, the processor is in communication with or includes memory 220, such as volatile and/or non-volatile memory that stores content, data or the like. For example, the memory 220 may store content transmitted from, and/or received by, the entity. Where, for example, the entity represents the data center 10, the memory may store, for example, error messages generated by the site devices 42, 44, action request messages generated by the client terminal 30 and intended for one of the site devices 42, 44, and/or data collected in association with respective site devices 42, 44, such as actions taken using the device, the operator responsible, and the time at which the action was taken. As discussed in more detail below, this information may be used to generate audit reports, electronic journals, and/or the like. In one embodiment, the memory 220 may further store authentication and permission information, as well as identifying criteria, discussed above and below.

Also for example, the memory 220 may store software applications, instructions or the like for the processor to perform steps associated with operation of the entity in accordance with embodiments of the present invention. In particular, the memory 220 may store software applications, instructions or the like for the processor to perform the operations described above and below with regard to FIGS. 3A-3C.

For example, wherein the entity represents the data center 10, according to one embodiment, the memory 220 may store one or more modules for instructing the processor 210 to receive, from a site server 42 (or in one embodiment a site terminal 44) over a first secure tunnel one or more error messages. In addition, memory 120 may store one or more modules for instructing the processor 210 to receive, from a client terminal 30 over a second secure tunnel, an authentication request associated with a technician, to authenticate the technician, and to determine whether the technician has permission to access at least one of the one or more error messages received. The memory 220 may further store one or more modules for instructing the processor 210 to provide the client terminal 30 with access to the at least one of the one or more error messages over the second secure tunnel if it is determined that the technician has permission.

Similarly, where the entity represents the client terminal 30, according to another embodiment, the memory 220 may store one or more modules for instructing the processor 210 to retrieve, from the data center 10 over a secure tunnel, one or more error messages associated with a site terminal 44 to which the client terminal (and, in particular, a technician operating the client terminal) has access. The memory 220 may further store one or more modules for instructing the processor 210 to generate an action request requesting that an action be taken by the corresponding site terminal 44 in order to begin resolving at least one of the error messages, and to transmit the action request to the data center 10.

In another embodiment, wherein the entity represents the site terminal 44, the memory 220 may store one or more modules for instructing the processor 210 to periodically, and automatically, monitor for one or more error conditions, generate one or more error messages based at least in part on the monitored error conditions, and transmit the one or more error messages either directly to the data center 10, or to the data center 10 via the site server 42. In addition, the memory 220 may store one or more modules for instructing the processor 210 to retrieve an action request generated by a client terminal 30 either directly from the data center 10, or from the data center 10 via the site server 42, and to take the action specified in the action request.

Finally, where the entity represents the file server 42, according to yet another embodiment, the memory 120 may store one or more modules for instructing the processor 210 to receive one or more error messages from each of one or more site terminals 44 associated with the site server 42, compile the error messages and transmit the error messages to the data center 10 over a secure tunnel. The memory 120 may further store one or more modules for instructing the processor 210 to generate and transmit to the data center 10 a message request requesting any messages (e.g., action requests) intended for one of the site terminals 44. In addition, the memory 120 may store one or more modules for instructing the processor 210 to, in response to receiving the messages, route the messages to the appropriate site terminal 44B.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Figure 3A:
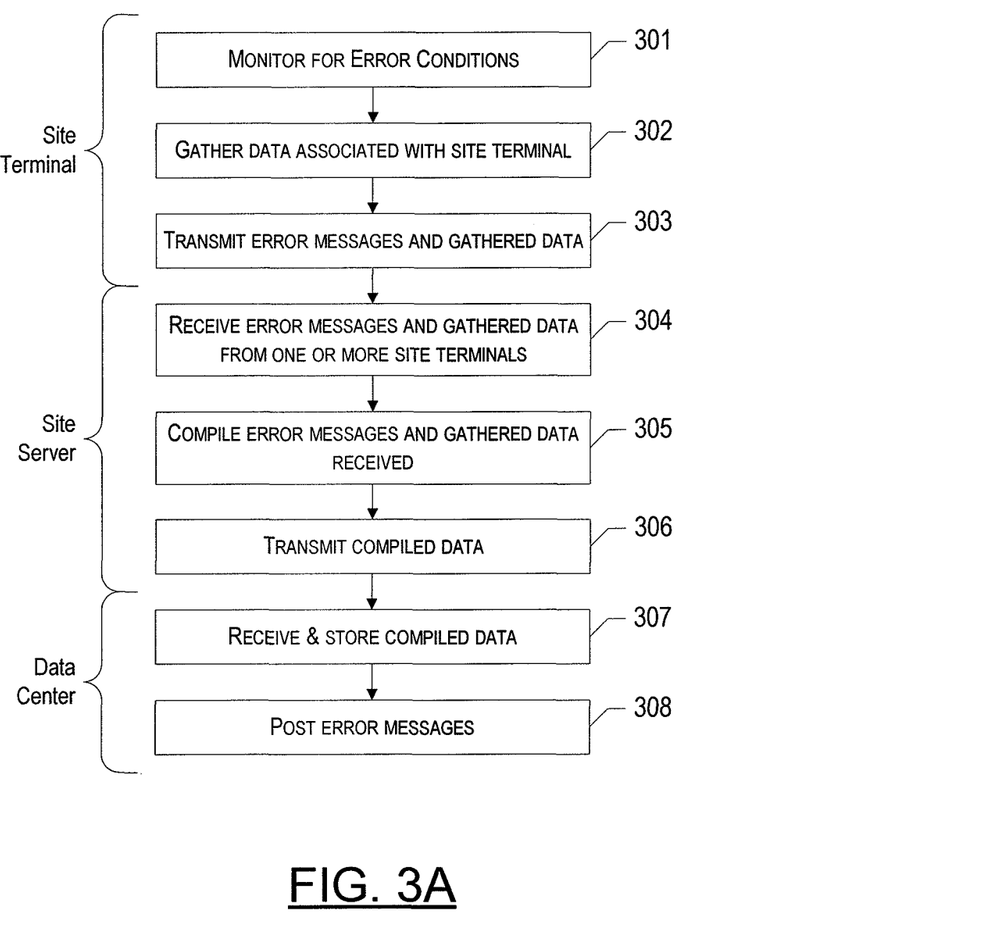
FIGS. 3A-3C are flowcharts illustrating the process that may be taken in order to provide maintenance and support in accordance with an embodiment described herein.
Figure 3B:
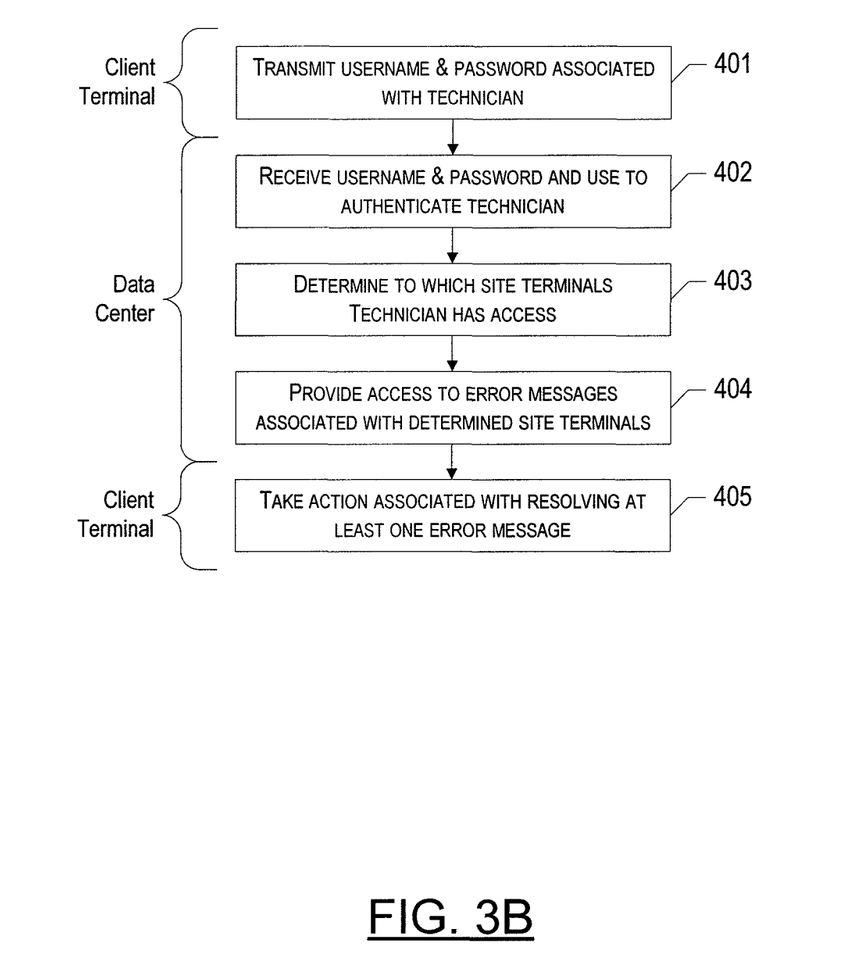
Figure 3C:
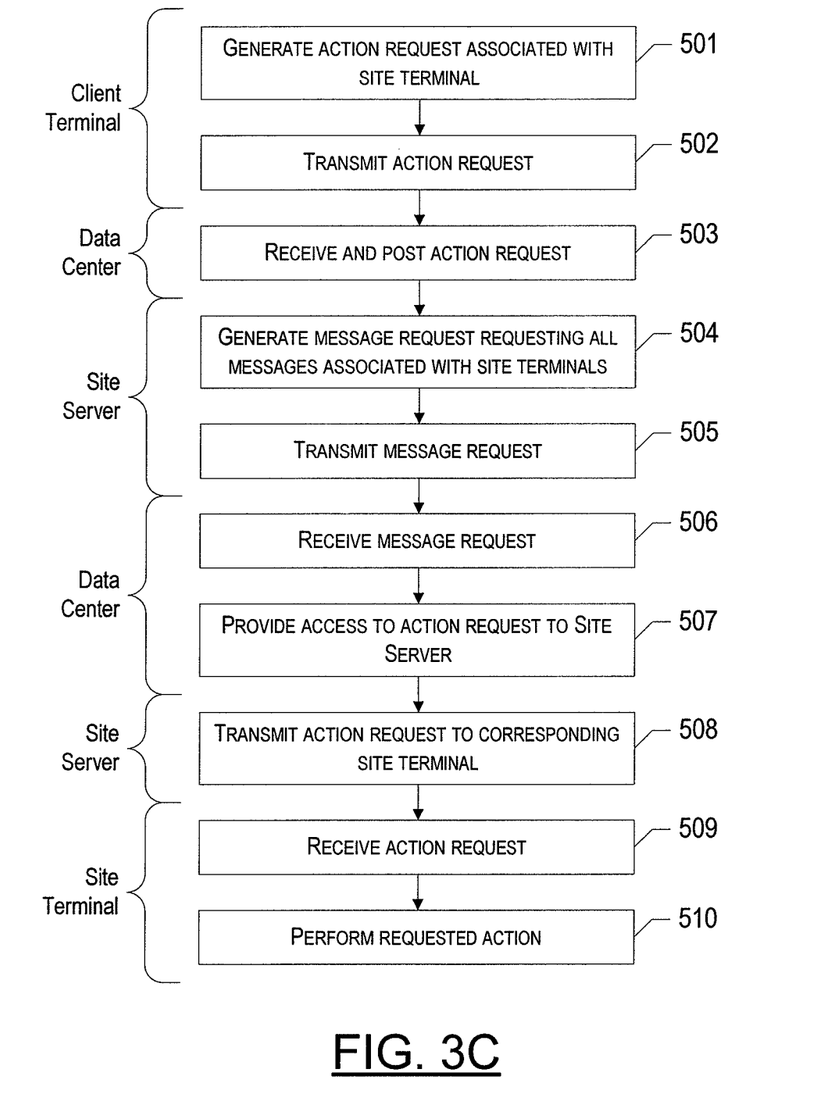

Method of Providing Secure, Remote Maintenance & Support:

Referring now to FIGS. 3A-3C, the operations are illustrated that may be taken in order to provide remote, secure maintenance and support to one or more devices (e.g., servers, site terminals, etc.) that may be located, for example, within a store, restaurant, hotel, movie theater, gas station, and/or other similar site. As shown, according to one embodiment, the process may begin at Block 301 when the site terminal 44 (e.g., a processor, or similar means, operating on the site terminal) periodically, and automatically, monitors for certain error conditions. As used herein, "error conditions" may refer to any condition or state associated with the site terminal 44 that is capable of being monitored. These conditions may, for example, include having low disk space (e.g., if less than 0.1% of the total space on the site terminal 44 is available); when Electronic Draft Capture (EDC) service is configured as automatic, but is not running; when there are pending offline credit transaction (e.g., .spl files exist on the site terminal); when there are unsettled credit card batches associated with the site terminal 44; and/or the like.

According to one embodiment, monitoring for certain error conditions may include monitoring security settings associated with the site terminal 44. In this embodiment, an "error condition" may include a change in the security settings that may compromise the site terminal 44 security. For example, an error condition may correspond to the credit card masking feature of the site terminal 44 accidentally being turned off.

As one of ordinary skill in the art will recognize in light of this disclosure, the foregoing provides only a few examples of error conditions that may be monitored. Any number and combination of error conditions particular to the specific environment and/or situation may be monitored without departing from the spirit and scope of embodiments described herein.

As described herein, "periodically" can refer to once every day, hour, minute, 30 seconds, or any other frequency established. In one embodiment, the error conditions for which the site terminal 44 monitors and/or the frequency with which they are monitored (e.g., how "periodically" is defined) may be user-defined. All defined error conditions may be checked during each period. Alternatively, different error conditions may be checked more frequently than others.

According to embodiments described herein, the site terminal 44 can monitor for error conditions automatically, or without operator intervention. In fact, according to one embodiment, this periodic monitoring can occur in the background of the site terminal, unbeknownst to the operator.

In addition to monitoring for error conditions, according to one embodiment, the site terminal 44 (e.g., processor, or similar means, operating on the site terminal) can, at Block 302, gather data associated with the site terminal 44. According to one embodiment, the data can be gathered automatically (i.e., without operator intervention) and unbeknownst to the site terminal 44 operator.

In one embodiment, the data gathered may include, for example, a serial number associated with the site terminal 44; inventory sold in association with transactions completed using the site terminal 44; addresses and phone numbers of customers completing transactions using the site terminal 44; the version of software running on site terminal 44; one or more hardware odometer readings of the site terminal 44; disk space of the site terminal 44; the operating system and service release level of the site terminal 44; the processor vendor and speed of the site terminal 44; network interface information of the site terminal 44; the available memory of the site terminal 44; and/or the like. In addition, or alternatively, according to one embodiment, the data gathered may include a list of one or more actions taken using the site terminal 44, an operator associated with each action, and a time at which the action was taken.

As above, the foregoing are merely examples of different data that can be collected. Any number, combination and type of data may be collected without departing from the spirit and scope of embodiments described herein.

At some point thereafter, at Block 303, the site terminal 44 (e.g., processor, or similar means, operating on the site terminal) can transmit one or more error messages associated with the monitored error conditions, as well as the gathered data to the site server 42. In one embodiment, like the monitoring and data gathering, this step may be performed automatically and without the knowledge of the site terminal 44 operator.

As described above, each site server 42 may be associated with any number of site terminals 44 located at the same site (e.g. geographic location). As a result, the site server 42 (e.g., processor, or similar means, operating on the site server 42) can receive (Block 304) and compile (Block 305) error messages and gathered data from one or more of the site terminals with which it is associated. In addition, while not shown, according to one embodiment, the site server 42 may, itself, acts as a site terminal. In this embodiment, the site server 42 may monitor for error conditions, gather data, and include its own error messages and gathered data in the data compiled at Block 305.

Once compiled, the site server 42 (e.g., processor, or similar means, operating thereon) can, at Block 306, transmit the compiled messages and data to the data center 10. As described above, according to one embodiment, the messages and gathered data may be transmitted using standard ports and over a first secure tunnel that has been created using, for example, SSH or SSL encryption techniques. According to one embodiment, a different frequency may be used to transmit different types of data. For example, error messages can be transmitted every few minutes, whereas hardware information, given the less-frequent nature of noteworthy changes, can be transmitted only every few hours.

Upon receipt of the error messages and gathered data, the data center 10 (e.g., processor, or similar means, operating on the data center) can store the messages and data in association with the overall site 40 and/or the corresponding site terminal 44. (Block 307). For example, according to one embodiment, at least some of the data gathered and received may be stored as an action log, or electronic journal, detailing different actions taken by different operators at different times, enabling such actions to be tracked. The data gathered and stored may be used by the data center 10 to generate one or more audit reports that may provide a detailed view of all actions taken at a site terminal and by which specific user they were initiated. According to embodiments described herein, the audit reports may be generated by central location (i.e., by a combination of sites associated with the same business or company—e.g., all restaurants in a franchise), site and/or site terminal. This detailed reporting capability of embodiments described herein may increase user accountability and/or improve resolution time. In addition, because the data is coming directly from the site terminal, the information may be considered more valid.

In addition to storing the data gathered and received, as described in more detail below, the data center (e.g., processor, or similar means, operating thereon) can, at Block 308, post, or make available to authorized technicians, the error messages received.

Figure 4:
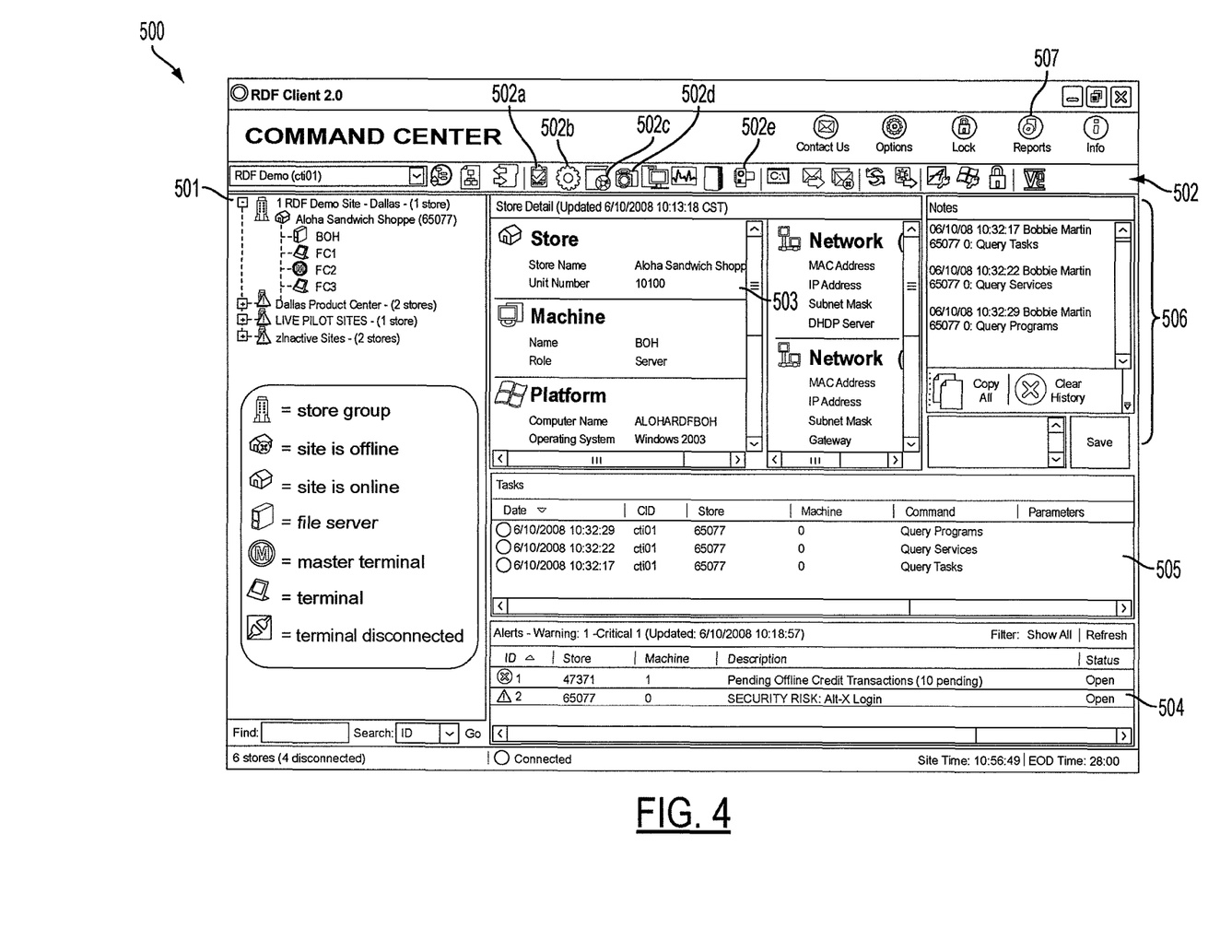
FIG. 4 is a screenshot of a user interface associated with a client terminal of one embodiment described herein.

Turning now to FIG. 4, the process of one embodiment can continue when a technician, or an individual trained to resolve different error conditions occurring in association with the site terminals, logs onto a client terminal 30 and inputs his or her username and password. In one embodiment, the technician may further input a rolling password (i.e., a password that periodically changes—e.g., every 60 seconds), for example, by an RSA® SecurID device. The client terminal 30 (e.g., processor, or similar means, operating on the client terminal) can transmit the username, password (and, in one embodiment, rolling password) (hereinafter "authentication information") to the data center 10 for authentication. In one embodiment, the client terminal may do so over a second secure tunnel created, for example, using SSH or SSL encryption. According to one embodiment, the secure tunnel used to transmit data between the client terminal 30 and the data center 10 may be a different secure tunnel than that established between the data center 10 and the site devices 42, 44.

Upon receipt of the authentication information, the data center 10 (e.g., processor, or similar means, operating on the data center) can authenticate the technician (Block 402) and determine to which site terminals 44 the technician has access (Block 403). In particular, according to one embodiment, authentication and permission information associated with a plurality of technicians may be stored in a database associated with or accessible by the data center 10. In addition, the database can store identifying criteria associated with each of the site terminals 44. This identifying criteria may include, for example, an IP address, domain name, network address, username, password, and/or the like, associated with the site terminal 44. The authentication and permission information, as well as the identifying criteria, may be used by the data center 10 to enable a technician to access certain site terminals 44 in order to take action with respect to those site terminals 44, without either the technician or the site terminal 44 having any specific knowledge of the other.

To illustrate, for example, each technician may have an individual account which provides unique and specific access to site terminals. Individual accounts can be authorized with unique permissions that define which actions can be taken at a site terminal (e.g., certain technicians may be allowed to remotely control a site terminal, while others may not). Former authorized technicians can be instantly removed from one central location without the need to update usernames or user identifications and passwords at each site terminal associated with the central location. Accordingly, embodiments described herein may increase both security and efficiency. In addition, managing all user credentials centrally in accordance with embodiments described herein may enable the easy addition or removal of technicians in one location.

The data center 10 of one embodiment may access this information in order to authenticate the technician and determine whether the technician has permission to access information associated with various site terminals (e.g., the error messages received and stored by the data center in association with the site terminal).

If the technician has access to information associated with one of the site terminals 44 having generated and transmitted error messages and data at Blocks 301-303 above, the data center 10 (e.g., processor, or similar means, operating on the data center) can, at Block 404, provide the corresponding client terminal 30 with access to those error messages. For example, the data center 10 (e.g., processor, or similar means, operating on the data center) may transmit the error messages to the client terminal 30 over the second secure tunnel, such that the client terminal 30 (e.g., processor, or similar means, operating on the client terminal) can cause the error messages to be displayed on a display screen associated with the client terminal 30. Because the data center 10 of one embodiment is responsible for authenticating technicians and providing them with access to certain site terminals 44, embodiments described herein can enable authorized technicians to access and take action with respect to a site terminal 44 without having to have any specific knowledge of that site terminal's 44 identifying criteria.

Upon reviewing the error messages, the technician, using his or client terminal 30, can, at Block 405, take an action associated with resolving at least one of the error messages. In one embodiment, the technician can take any subsequent action with respect to any site terminal 44 to which the technician has access without having to uniquely log onto or request access to that site terminal 44. In other words, once the technician has been authenticated and the data center 10 has determined to which site terminals 44 the technician has access, the technician can take any permissible subsequent actions with respect to those site terminals 44. FIG. 3C, which is discussed below, provides one example of how such an action can be taken in association with embodiments described herein.

Turning to FIG. 3C, according to one embodiment, in order to take an action in response to an error message, the technician, using his or her client terminal 30, may generate an action request requesting that a particular action be taken by the corresponding site terminal 44. (Block 501). This action request can thereafter be transmitted by the client terminal 30 (e.g., processor, or similar means operating on the client terminal) to the data center 10, which may receive and post the action request. (Blocks 502 & 503).

According to embodiments described herein, the action request may include a request for any action capable of being performed by the site terminal 44. For example, actions may include requesting a list of services currently operating on the site terminal 44 (Query Services); requesting a list of all applications and security updates currently installed on the selected site terminal 44 (Query Programs); requesting a list of all tasks currently running on the site terminal 44 (Query Tasks); stopping, starting, or restarting any of the services, applications, or tasks associated with the site terminal 44; requesting a list of all environment variables defined for the site terminal 44 (Query environment); transferring one or more files between the client terminal 30, the data center 10 and the site terminal 44; requesting a captured picture of the current screen (i.e., a screenshot) of the site terminal; requesting a diagnostic file set, or common diagnostic files needed to research an issue; requesting a captured video clip of the current screen activity (e.g., the technician may use to view exactly what occurs on the site terminal); rebooting the site terminal 44; view the electronic journal; view audit reports; and/or the like. As one of ordinary skill in the art will recognize, the foregoing merely provide examples of actions that may be taken by a technician in various numbers and combinations in order to resolve a detected error condition. Other similar actions may likewise be taken in different numbers and combinations without departing from the spirit and scope of embodiments described herein.

According to one embodiment, one or more actions may be the result of "auto-fixes" associated with the particular error message. In particular, according to this embodiment, upon accessing the error messages associated with a particular site terminal 44, a technician may select the message (e.g., by right-clicking a mouse associated with the client terminal at the moment the cursor is on top of or in the vicinity of the error message) causing one or more predefined auto-fixes to the error condition to be displayed. The technician may thereafter select one of the auto-fixes causing an action request associated with the auto-fix to be automatically generated and transmitted to the data center.

At some point in the process, a site server 42 (e.g., processor, or similar means, operating thereon) can generate and transmit to the data center 10 (e.g., over the first secure tunnel) a message request requesting all messages or requests intended for a site terminal 44 with which the site server 42 is associated. (Blocks 504 & 505). If the action request transmitted by the client terminal 30 is intended for a site terminal 44 associated with the site server 42, in response to receiving the message request (Block 506), the data center 10 (e.g., processor, or similar means, operating thereon) can, at Block 507, provide the site server 42 with access to the action message.

As described above, according to one embodiment, the action request is not transmitted, or pushed, to the site server 42. Instead, the site server 42 retrieves, or pulls, the action request. This outbound-initiated communication may reduce the risk of an intruder accessing the site server 42 or any of the site terminals 44, since open in-bound connections to site terminals 44 may be inherently insecure. In addition, use of only outbound-initiated communications may significantly reduce or eliminate the need for user interaction at the site terminal 44. In other words, a connection can be made to the data center 10 (and thereby an authorized technician) in the background of the site terminal 44 without interrupting normal site operations.

After retrieving the action request, the site server 42 (e.g., processor, or similar means, operating on the site server) can transmit, or route, the action request to the appropriate site terminal 44. (Block 508). The site terminal 44 can receive the action request, at Block 509, and, in response, perform the requested action (Block 510). This may include, for example, transmitting requested information (e.g., lists of services, applications, tasks, etc., captured image of display screen, captured video of performed functions, etc.) to the data center 10 (e.g., via the site server 42), such that the requested information can be made available to the client terminal 30.

According to embodiments described herein, the foregoing steps may be repeated as necessary in order to resolve a particular error condition. For example, if the original action request was for a list of services operating on the site terminal 44, the site terminal may first respond with the requested list. Upon accessing the requested list via the data center 10, the technician may determine that one of the services should be stopped, started or restarted. A subsequent action request may, therefore, be generated and transmitted by the client terminal 30 to the data center 10 indicating the desired action to be taken in association with a selected service. The site server 42 may retrieve this new action, in the manner described above, and route it to the site terminal 44, which may again take the requested action.

In addition to the actions described above that may be taken by the client terminal 10 in order to resolve an error condition, according to one embodiment, in some instances it may be necessary, or at least beneficial, to remotely access and assume control of the site terminal. In one embodiment, this action may be taken only if all other available actions have been found inadequate in resolving the issue. As with the desired actions above, in order to remotely control the site terminal 44, the client terminal 30 can generate and transmit to the data center 10 (e.g., via the second secure tunnel) an action request requesting that the site terminal 44 take the steps necessary to enable remote control. The site server 42 may retrieve and route the action request, in the manner described above. In response, the site terminal 44 can take the necessary steps to establish an SSH tunnel and a secure virtual network computing (VNC) session with the client terminal 30 via the data center 10. For example, remote access can be established when the site server 42 establishes a SSH tunnel to the data center 10, followed by the client terminal 30 also establishing a SSH tunnel to the data center 10. Once created, VNC on the site terminal 44 can connect to the tunnel endpoint on the site server 42, which can connect the tunnel to the VNC client application listening on the client terminal 30. According to embodiments described herein, while a remote control connection can be established, this is still not a direct connection between the client terminal 10 and the site terminal 44. Instead, like all previously described communications and connection, the connection is via the data center 10 (and, in one embodiment, the site server 42).

According to one embodiment, when the site terminal 44 is remotely controlled, the data center 10 may only log (e.g., for audit purposes) that a technician has remotely accessed and controls the site terminal 44. The specific actions taken by the technician once he or she has control may not be logged or tracked.

As described above, according to embodiments, one or more steps taken by a site terminal 44 can be performed automatically (e.g., without user intervention) and, in fact, unbeknownst to the site terminal operator. As a result, embodiments described herein may be less intrusive and obstructive to the ordinary operations of the site terminals 44.

In addition, as described above, according to embodiments, a technician may perform various actions in order to resolve an error associated with a site terminal 44 without directly connecting to the site terminal 44, or even to the site server 42 associated with the site terminal 44. In fact, according to one embodiment, the technician need not have any specific knowledge of the site terminal 44 at all. Instead, all communications can be through a data center 10 acting as a proxy between the client terminal 10 and the site devices (i.e., site server 42 and site terminals 44).

As one of ordinary skill in the art will recognize, the foregoing provides just one example of how the client and site terminals 30, 44 may interact with the data center 10 and one another. It is provided for exemplary purposes only and should not be taken in any way as limiting embodiments of the present invention to the specific method described. In particular, the order in which the foregoing steps are provided may be altered without departing from the spirit and scope of embodiments of the present invention. For example, while the foregoing assumes that the site terminal 44 generates and transmits error messages to the data center 10 (via the site server 42) before a technician is authenticated and attempts to access error messages associated with that site terminal 44, embodiments are not limited to this particular order. Alternatively, the technician may be authenticated and attempt to view error messages before, during, and/or after the site terminal has generated and transmitted error messages.

Command Center Screen Overview:

FIG. 4 provides a screen shot of a user interface 500 a technician may use when accessing the data center 10 using his or her client terminal 30 in accordance with one embodiment. As shown, according to one embodiment, the technician may view a site tree 501 or a group of sites (e.g., geographic locations) for a selected company, as well as any active devices (e.g., site servers 42 and/or site terminals 44) associated with that site. According to one embodiment, the technician may edit the site tree, as well as perform actions and view statuses associated with certain devices at the site using the site tree. A toolbar 502 can also be provided for performing the various actions associated with the site terminals 44 described above. In particular, according to one embodiment, in order to generate an action request described above, the technician can select the icon that is associated with that action included in the toolbar 502. For example, an icon may be associated with querying tasks 502a, services 502b, and/or programs 502c. Similarly, an icon may be included in the toolbar 502 in association with requesting an image of the current screen of the site terminal 502d, or requesting a video clip of the current activity of the site terminal 502e.

The user interface may further provide detailed information 503 about various sites and the devices (or machines) operating at those sites. According to one embodiment, a list of alerts 504 may be provided including a list of potential situations for which immediate action may be desired. This list of alerts 504 may assist in keeping companies compliant with certain data security standards. According to one embodiment, a technician may right-click on an alert in order to perform an auto-fix (or pre-defined action) associated with the alert. Alternatively, a technician may double-click (or otherwise select) a site in order to be directed to a webpage associated with the corresponding site for the affected device. The alerts may further be able to be filtered, for example, by site.

According to one embodiment, the user interface may further provide a list of tasks 505 (e.g., queries, commands, etc.) performed and a status of the task (e.g., pending or complete). In one embodiment, a technician can select (e.g., by double clicking on) the task in order to view the results, or he or she can right-click on a pending task in order to cancel it. As shown, the user interface may also include notes 506 that may chronicle the actions that have been performed, and which have been saved by the data center 10.

In addition to using the interface to request actions associated with resolving error conditions of a site terminal, a technician may use this interface in order to request that an audit report be generated by, for example, selecting the Reports icon 507. As noted above, audit reports can be generated by the data center 10 by site, central location and/or site terminal 44. These reports may display all actions performed and the user who performed each action. A report associated with the site terminal may be based on the site terminal's serial number.

CONCLUSION

By providing real-time monitoring of the site terminals, embodiments described herein may result in fewer issues and faster resolutions. In particular, as described above, according to embodiments described herein, the health of both the hardware and the software may be automatically and continuously sent to the data center where is may be evaluated by a technician to ensure optimal performance and up-time.

In addition, according to embodiments described herein, site security settings may be continuously monitored and the data center (and thereby authorized technicians) may be automatically notified if changes that compromise the site terminal security are made. This may ensure that site terminals are PCI-compliant 365 days a year not just on the day of an audit.

Embodiments described herein further may prevent disruptions at the site terminals before they occur. In particular, by transmitting proactive alerts to the data center (and thereby accessibly by authorized technicians), embodiments described herein allow many issues to be resolved before they impact the site terminal's operations. Proper ongoing maintenance of site terminals may reduce the frequency of site terminal issues and/or decrease the time required to resolve those that do occur.

In addition to the foregoing, embodiments described herein may increase the accountability for actions taken at a particular site terminal. In particular, according to embodiments described herein, all actions taken at a site terminal may be automatically logged and tracked to a specific authorized user. This function, referred to as an "Electronic Journal," can be used to investigate transaction-related events at the site.

Finally, embodiments described herein may enable users associated with the site terminals (e.g., waiters, waitresses, hosts and/or hostesses at a restaurant; the concierge at a hotel; etc.) to spend more time with guests and not support staff (e.g., technicians). In particular, power support features of the embodiments described herein may allow remote support staff (e.g., technicians) to quickly diagnose issues without causing additional disruption to staff operations. Corrective actions can further be taken without the need to temporarily take over servers and terminals.

As described above and as will be appreciated by one skilled in the art, embodiments of the present invention may be configured as a system, method or apparatus. Accordingly, embodiments described herein may be comprised of various means including entirely of hardware, entirely of software, or any combination of software and hardware. Furthermore, embodiments described herein may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the maintenance and support system and method have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 210 discussed above with reference to FIG. 2, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 210 of FIG. 2) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A system comprising:
    a point-of-sale (POS) terminal located at a first location, wherein the point-of-sale terminal is capable of accepting credit card information;
    a site server located at the first location and in wired or wireless communication with the POS terminal over a local area network;
    a data center comprising a server and a database, said data center being located at a second location remote from the first location;
    a client terminal comprising a processor and a communication interface, said client terminal being located at a third location remote from the first location and the second location; and
    a network connecting the site server, the data center, and the client terminal;
    wherein the site server is in communication with the data center over the network via a first secure tunnel;
    wherein the client terminal is in communication with the data center over the network via a second secure tunnel, the first and second secure tunnels have encrypted communications and are different from one another, and the client terminal does not directly communicate with the site server, and wherein all electronic data and network-based communication between the client terminal and the POS terminal is via the data center;
    wherein the client terminal is operated by an authorized technician for monitoring and addressing error conditions for the POS terminal, and wherein the client terminal is a laptop or a Personal Digital Assistant (PDA);
    wherein the POS terminal is configured to:
        automatically and periodically, at a defined frequency, monitor for an error condition comprising a change in security settings for the POS terminal where credit card masking is turned off, and monitor by the site server for the error condition in a background process unbeknownst to any operator of the site server; and
        transmit an error message to the site server over the local area network, wherein the error message comprises information relating to the error condition;
    wherein the site server is configured to:
        receive the error message from the POS terminal; and
        collect the error message with other collected error messages and periodically transmit the collected error messages to the data center over the first secure tunnel; and
    wherein the data center is configured to:
        receive the collected error messages from the site server;
        store the collected error messages in the database; and
        associate the at least one collected error message with the technician.

2. The system of claim 1 wherein the data center is further configured to:
- receive identification information from the client terminal over the second secure tunnel;
- authenticate the technician using the identification information;
- query the database to retrieve all collected error messages associated with the technician;
- transmit the retrieved error messages associated with the technician to the client terminal over the second secure tunnel; and
- receive an action request from the client terminal over the second secure tunnel.

3. The system of claim 2 wherein the data center is further configured to:
- receive a pull action message request from the site server over the first secure tunnel; and
- transmit the action request to the site server over the first secure tunnel.

4. The system of claim 3 wherein the site server is further configured to perform the action contained in the action request.

5. The system of claim 3 wherein the site server transmits a pending offline credit transaction file to the data center over the first secure tunnel in response to the action request.

6. A method comprising:
- automatically and periodically, at a defined frequency, monitoring, by a point-of-sale (POS) terminal, for an error condition comprising a change in security settings for the POS terminal where credit card masking is turned off, wherein monitoring further includes monitoring as a background process on the POS terminal unbeknownst to any operator of a site server;
- transmitting, by the POS terminal, an error message to the site server over a local area network, wherein the error message comprises information relating to the error condition;
- receiving, by the site server, the error message from the POS server;
- periodically transmitting, by the site server, collected error messages that include the error message, other collected error messages, and at least one site server error message collected by the site server on itself, the collected error messages sent to a data center over a first secure tunnel on a network, the first secure tunnel using encrypted communications;
- receiving, by the data center, the collected error messages from the site server;
- storing, by the data center, the collected error messages in a database; and
- associating, by the data center, at least one of the collected error messages with an authorized technician operating a client terminal for monitoring and addressing error conditions on the POS terminal, wherein the client terminal indirectly communicates with the POS terminal, and wherein all electronic data and network-based communication between the client terminal and the POS terminal occurs through the data center, wherein the client terminal is one of: a laptop and a Personal Digital Assistance (PDA).

7. The method of claim 6 further comprising:
- receiving, by the data center, identification information from the client terminal over a second secure tunnel on the network, wherein said identification information is associated with a technician;
- authenticating, by the data center, the client terminal using the identification information;
- querying, by the data center, the database to retrieve all collected error messages associated with the technician;
- transmitting, by the data center, those collected error messages that are associated with the technician to the client terminal over the second secure tunnel, the second secure tunnel different from the first secure tunnel, and the second secure tunnel using second encrypted communications; and
- receiving, by the data center, an action request from the client terminal over the second secure tunnel.

8. The method of claim 7 further comprising:
- receiving, by the data center, a pull action message request from the site server over the first secure tunnel; and
- transmitting, by the data center, the action request to the site server over the first secure tunnel.

9. The method of claim 8 further comprising: performing, by the site server, an action included in the action request.

10. The method of claim 8 further comprising: transmitting, by the site server, a pending offline credit transaction file to the data center over the first secure tunnel in response to the action request.

* * * * *